US009900479B2

(12) United States Patent
Morisawa

(10) Patent No.: US 9,900,479 B2
(45) Date of Patent: Feb. 20, 2018

(54) OPERATION APPARATUS

(71) Applicant: Sony Corporation, Tokyo (JP)

(72) Inventor: Rui Morisawa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/338,797

(22) Filed: Oct. 31, 2016

(65) Prior Publication Data

US 2017/0048428 A1 Feb. 16, 2017

Related U.S. Application Data

(63) Continuation of application No. 14/940,536, filed on Nov. 13, 2015, now Pat. No. 9,538,063, which is a
(Continued)

(30) Foreign Application Priority Data

Dec. 27, 2013 (JP) ................. 2013-273519

(51) Int. Cl.
*H04N 5/232* (2006.01)
*H04N 5/225* (2006.01)
(Continued)

(52) U.S. Cl.
CPC .......... *H04N 5/2252* (2013.01); *G03B 17/20* (2013.01); *G03B 17/38* (2013.01); *G03B 17/561* (2013.01); *G03B 17/568* (2013.01); *G06F 1/163* (2013.01); *G06F 3/0362* (2013.01); *H01H 9/025* (2013.01); *H01H 9/0235* (2013.01);
(Continued)

(58) Field of Classification Search
CPC .... H04N 5/2252; H04N 5/44; H04N 5/23241; H04N 5/23206; H04N 5/4403; H04N 21/4622; H04N 21/4126; H04N 21/4886; H04N 21/21805; H04N 5/2251;
(Continued)

(56) References Cited

U.S. PATENT DOCUMENTS

2004/0012810 A1  1/2004  Haas
2005/0120381 A1  6/2005  Yamaguchi
(Continued)

FOREIGN PATENT DOCUMENTS

JP   2001-326845 A   11/2001
JP   2002-281468 A    9/2002
(Continued)

OTHER PUBLICATIONS

International Search Report dated Mar. 30, 2015 (Form PCT/ISA/210) for corresponding WIPO Application No. PCT/JP2014/006311.

*Primary Examiner* — Yogesh Aggarwal
(74) *Attorney, Agent, or Firm* — Michael Best & Friedrich LLP

(57) ABSTRACT

Provided is an operation apparatus including a main body section including an operation section including a first operation section for performing a record operation of an image pickup device and a display section that displays an image transmitted from the image pickup device, and a fixation section that fixes the main body section to an attachment object. The first operation section and the display section are both located on a first face of the main body section.

20 Claims, 13 Drawing Sheets

Related U.S. Application Data continuation of application No. 14/337,756, filed on Jul. 22, 2014, now Pat. No. 9,247,119.

(51) Int. Cl.

| | | |
|---|---|---|
| *G03B 17/56* | (2006.01) | |
| *H01H 9/02* | (2006.01) | |
| *H04N 7/18* | (2006.01) | |
| *H04N 21/218* | (2011.01) | |
| *H04N 21/41* | (2011.01) | |
| *H04N 21/462* | (2011.01) | |
| *H04N 21/488* | (2011.01) | |
| *G06F 1/16* | (2006.01) | |
| *H04N 5/44* | (2011.01) | |
| *G03B 17/20* | (2006.01) | |
| *G03B 17/38* | (2006.01) | |
| *G06F 3/0362* | (2013.01) | |
| *H04M 1/725* | (2006.01) | |

(52) U.S. Cl.
CPC ........ *H01H 9/0242* (2013.01); *H04N 5/2251* (2013.01); *H04N 5/23203* (2013.01); *H04N 5/23206* (2013.01); *H04N 5/23241* (2013.01); *H04N 5/23293* (2013.01); *H04N 5/44* (2013.01); *H04N 5/4403* (2013.01); *H04N 7/181* (2013.01); *H04N 21/21805* (2013.01); *H04N 21/4126* (2013.01); *H04N 21/4622* (2013.01); *H04N 21/4886* (2013.01); *H01H 2009/0257* (2013.01); *H04M 1/7253* (2013.01); *H04M 1/72533* (2013.01); *H04N 2005/4408* (2013.01)

(58) Field of Classification Search
CPC ....... G03B 17/20; G03B 17/38; G06F 3/0362; G06F 1/163

USPC .............. 348/14.05, 114, 211.99, 211.8, 734
See application file for complete search history.

(56) References Cited

U.S. PATENT DOCUMENTS

| | | | |
|---|---|---|---|
| 2006/0152491 | A1 | 7/2006 | Lian |
| 2007/0021058 | A1 | 1/2007 | Arseneau et al. |
| 2008/0018497 | A1* | 1/2008 | Farnham ............... G07C 5/0825 340/995.1 |
| 2009/0163185 | A1 | 6/2009 | Lim |
| 2010/0149432 | A1* | 6/2010 | Roberts ................. H04N 5/4403 348/734 |
| 2010/0188473 | A1 | 7/2010 | King et al. |
| 2011/0295547 | A1* | 12/2011 | Asada ................... A61B 5/1118 702/141 |
| 2012/0072945 | A1 | 3/2012 | Ortiz et al. |
| 2012/0307091 | A1 | 12/2012 | Yumiki |
| 2012/0309526 | A1 | 12/2012 | Nogami et al. |
| 2013/0194430 | A1 | 8/2013 | Worrill |
| 2013/0235234 | A1* | 9/2013 | Cucci ................. H04N 5/23206 348/231.99 |
| 2015/0303695 | A1* | 10/2015 | Perry ................. H01M 10/4207 307/80 |

FOREIGN PATENT DOCUMENTS

| | | |
|---|---|---|
| JP | 2004-104369 A | 4/2004 |
| JP | 2004-356767 A | 12/2004 |
| JP | 2007-312113 A | 11/2007 |
| JP | 2009-503922 A | 1/2009 |
| JP | 2012-099889 A | 5/2012 |

* cited by examiner

OPERATION APPARATUS

CROSS REFERENCE TO RELATED APPLICATIONS

The present invention is a Continuation of application Ser. No. 14/940,536, filed Nov. 13, 2015, which is a Continuation of application Ser. No. 14/337,756, filed Jul. 22, 2014, now U.S. Pat. No. 9,247,119 issued Jan. 26, 2016, which claims priority from Japanese Priority Patent Application 2013-273519 filed Dec. 27, 2013, the entire contents of which are incorporated herein by reference.

BACKGROUND

The present disclosure relates to an operation apparatus.

In recent years, products such as digital cameras, which apply communication technology to image pickup devices, are distributed generally. The behaviors of these image pickup devices can be controlled via communication from an external information processing device or the like.

For example, JP 2001-326845A discloses a technology that controls the behaviors of a plurality of image pickup devices by means of one remote controller, and displays the image acquired from each image pickup device on the display of the remote controller.

SUMMARY

However, the remote controller described in above JP 2001-326845A is portable, but is designed on the assumption that the user carries and uses the remote controller in the user's hand. For this reason, for example, when the user operating the image pickup device uses the remote controller while moving, the hands of the user are occupied in most cases, which impairs the usability. Therefore, there is a need for a remote controller having good portability and operability.

According to an embodiment of the present disclosure, there is provided an operation apparatus including a main body section including an operation section including a first operation section for performing a record operation of an image pickup device and a display section that displays an image transmitted from the image pickup device, and a fixation section that fixes the main body section to an attachment object. The first operation section and the display section are both located on a first face of the main body section.

As described above, the present disclosure provides an operation apparatus having good portability and operability. Note that the above effects are not necessarily restrictive, but any effect described in the present specification or another effect that can be grasped from the present specification may be achieved along with the above effects or instead of the above effects.

DETAILED DESCRIPTION OF THE EMBODIMENT(S)

Figure 1:
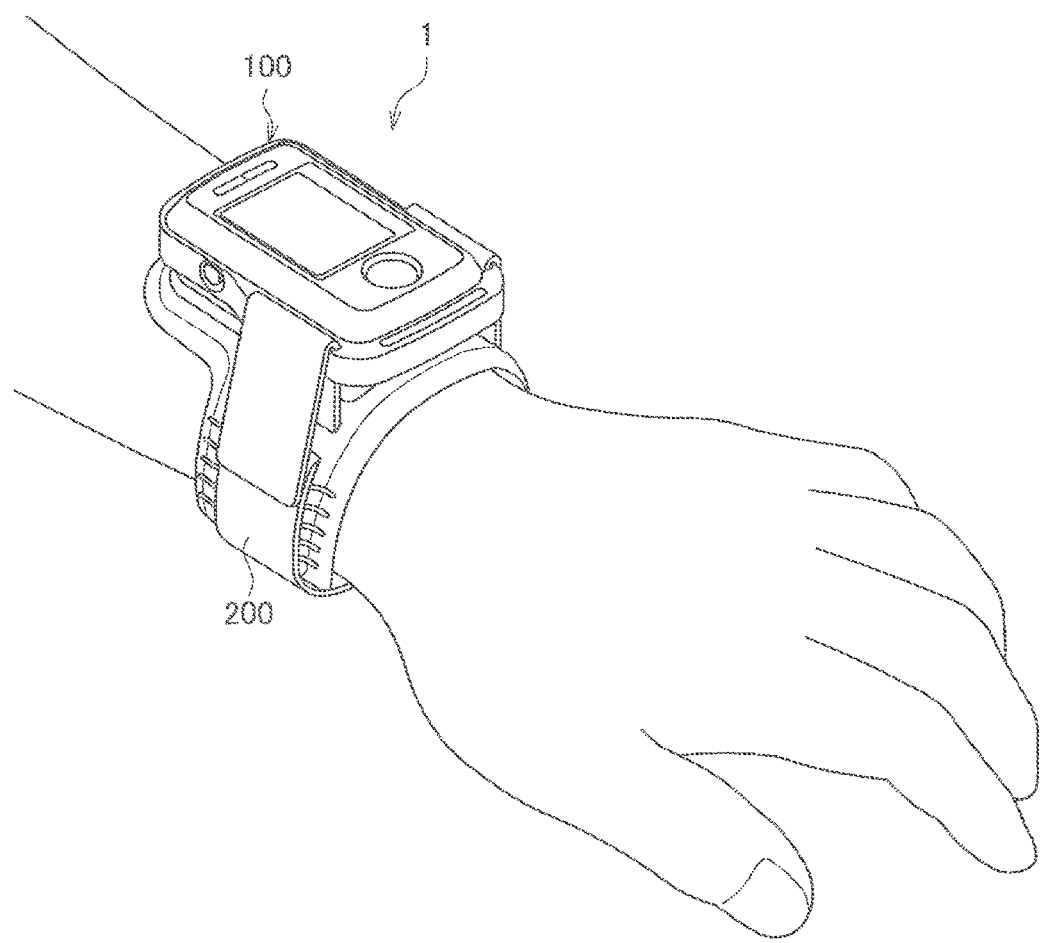
FIG. 1 is an explanatory diagram illustrating an operation apparatus according to an embodiment of the present disclosure, in a state worn and used on an arm.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be made in the following order.
1. Overview of Operation Apparatus
2. Operation Device
2. 1. Shape and Size
2. 2. Front Face
2. 3. Back Face
2. 4. Side Faces
3. Fixation Section
4. Functional Configuration
5. Use of Operation Apparatus
6. Conclusion <1. Overview of Operation Apparatus>

Figure 2:
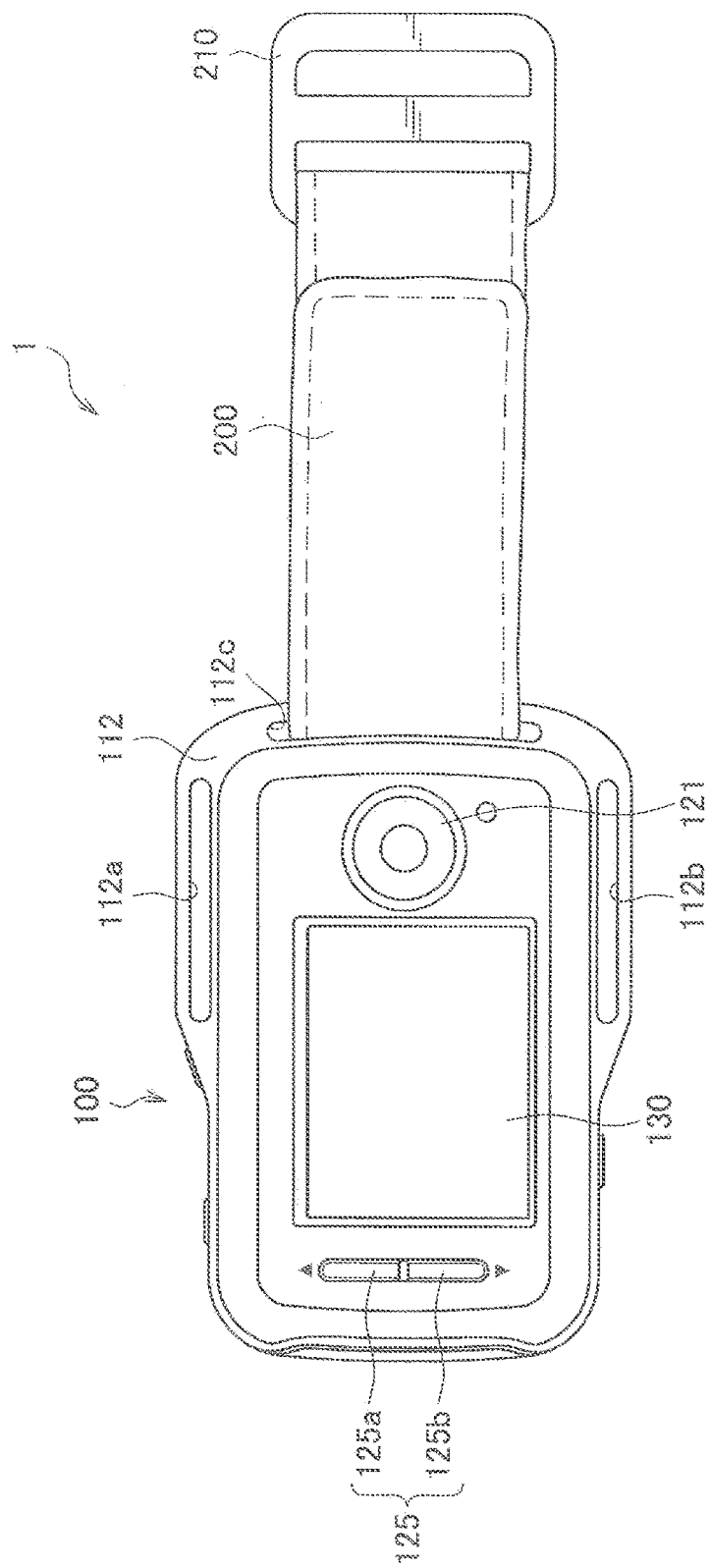
FIG. 2 is an explanatory diagram illustrating an example of an operation apparatus according to an embodiment, in a state to be attached to and used on an attachment object.

First, with reference to FIG. 1 and FIG. 2, description will be made of an overview of an operation apparatus 1 according to an embodiment of the present disclosure. Note that FIG. 1 is an explanatory diagram illustrating the operation apparatus 1 according to the present embodiment, in a state worn and used on an arm. FIG. 2 is an explanatory diagram illustrating one example of the operation apparatus 1 according to the present embodiment, in a state to be attached to and used on an attachment object.

The operation apparatus (also referred to as information processing device) 1 according to the present embodiment is a remote controller to operate the image pickup device (not illustrated in the drawings) by transmitting and receiving operation commands by near field wireless communication such as Wi-Fi and Bluetooth. The image pickup device operated by the operation apparatus 1 is a device equipped with an image pickup section, and is for example, a digital camera, a video camera, a vehicle or an airplane equipped with a camera, and the like. The operation apparatus 1 can operate an image pickup device positioned away from a user wearing the operation apparatus 1. The operation apparatus 1 operates the shooting of the image pickup device.

The operation apparatus 1 according to the present embodiment includes an operation device 100 that operates the image pickup device, and a fixation section 200 that holds the operation device 100 and attaches the operation device 100 to an attachment object. As illustrated in FIG. 1, in the operation apparatus 1, a belt which is the fixation section 200 is attached to two opposite positions of the operation device 100. By this structure, the user who operates the image pickup device can use the operation apparatus 1 by attaching the operation apparatus 1 to an arm, as illustrated in FIG. 1. By enabling the operation device 100 to be attached to the arm, the user can easily carry the operation apparatus 1. Apart from the arm of the user, the operation device 100 can be attached to a handlebar of a bicycle, and the like, for example.

Also, as illustrated in FIG. 2, in the operation apparatus 1, the fixation section 200 may be attached to one side portion of the operation device 100. When the belt, which is the fixation section 200, is folded at one side portion of the operation device 100 to form the belt in a ring shape, the operation apparatus 1 can be hooked on and attached to the attachment object such as, for example, a bag. Thereby, the user can get the hands off from the operation apparatus 1, when the user do not manipulate the operation apparatus 1.

In the following, detailed description will be made of the operation device 100 and the fixation section 200, which make up the operation apparatus 1.

<2. Operation Device>

Figure 3:
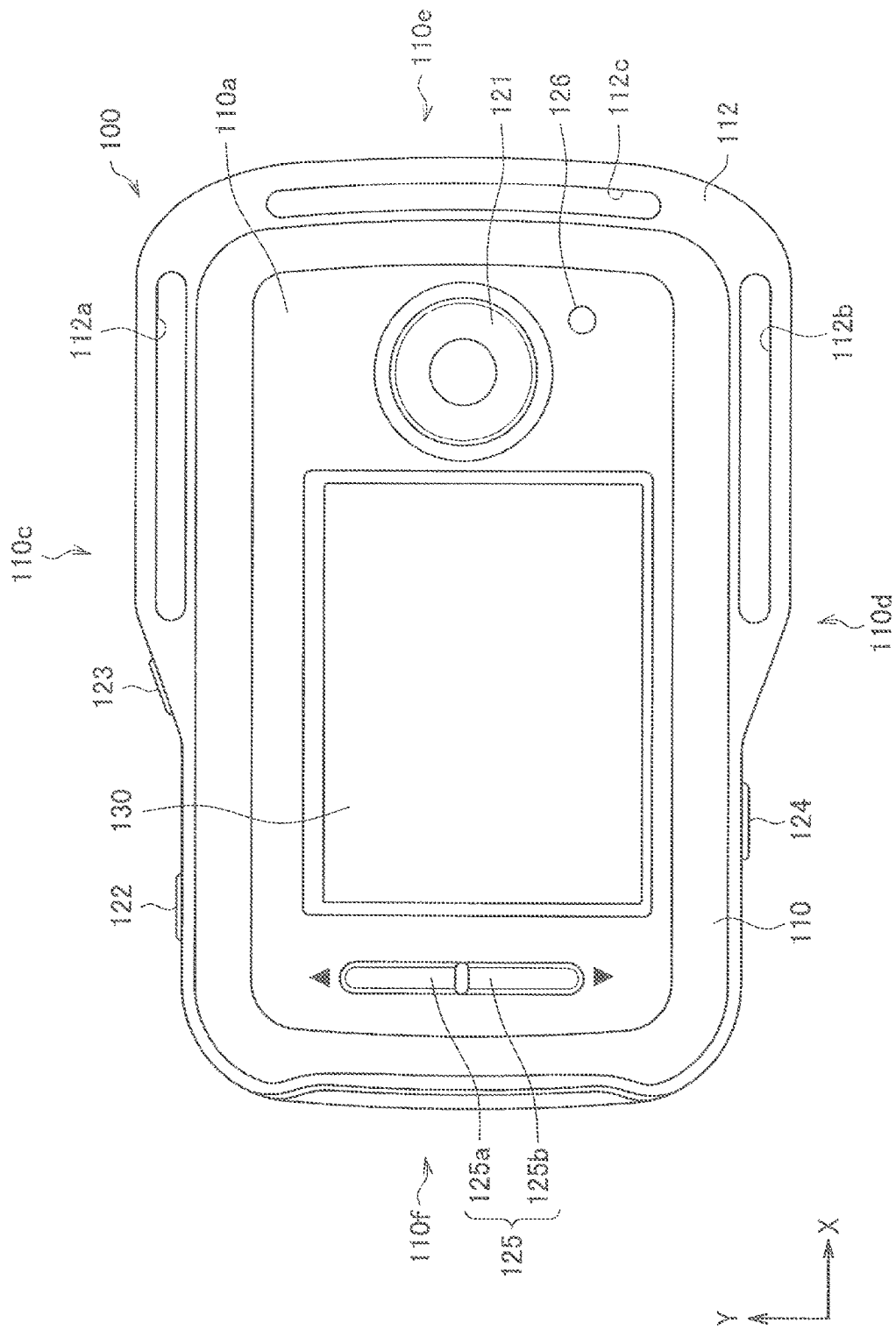
FIG. 3 is a front face view of an operation device according to an embodiment.
Figure 4:
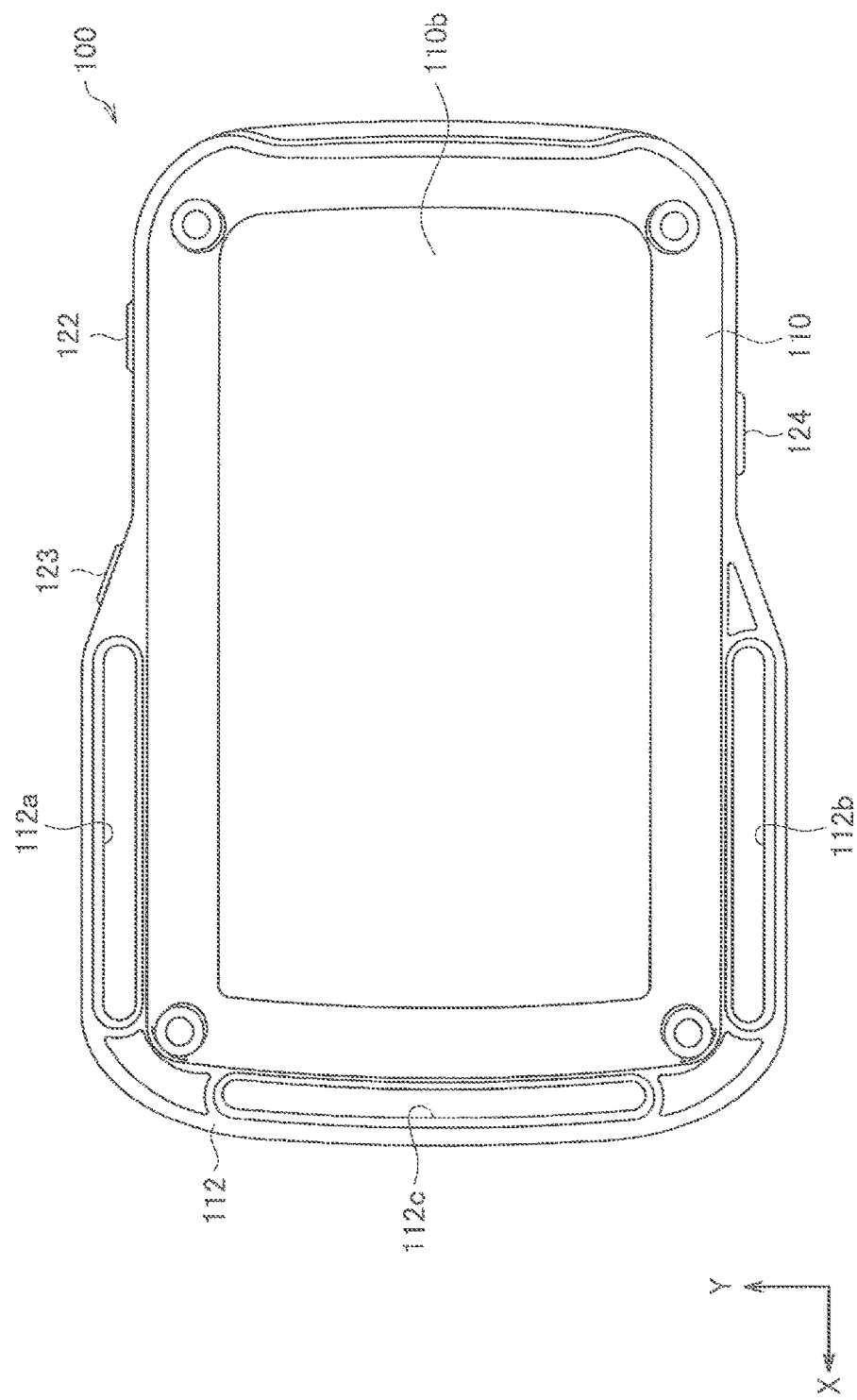
FIG. 4 is a back face view of an operation device according to an embodiment.
Figure 5:
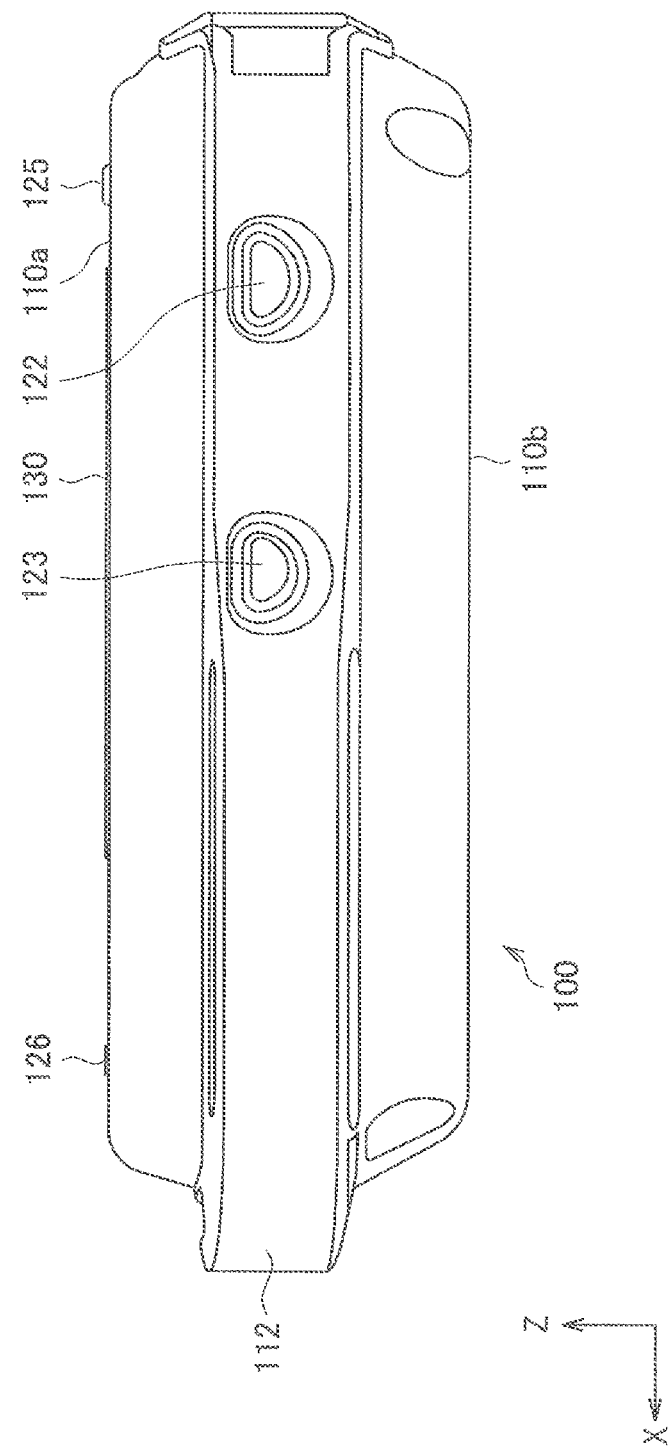
FIG. 5 is an upper side face view of an operation device according to an embodiment.
Figure 6:
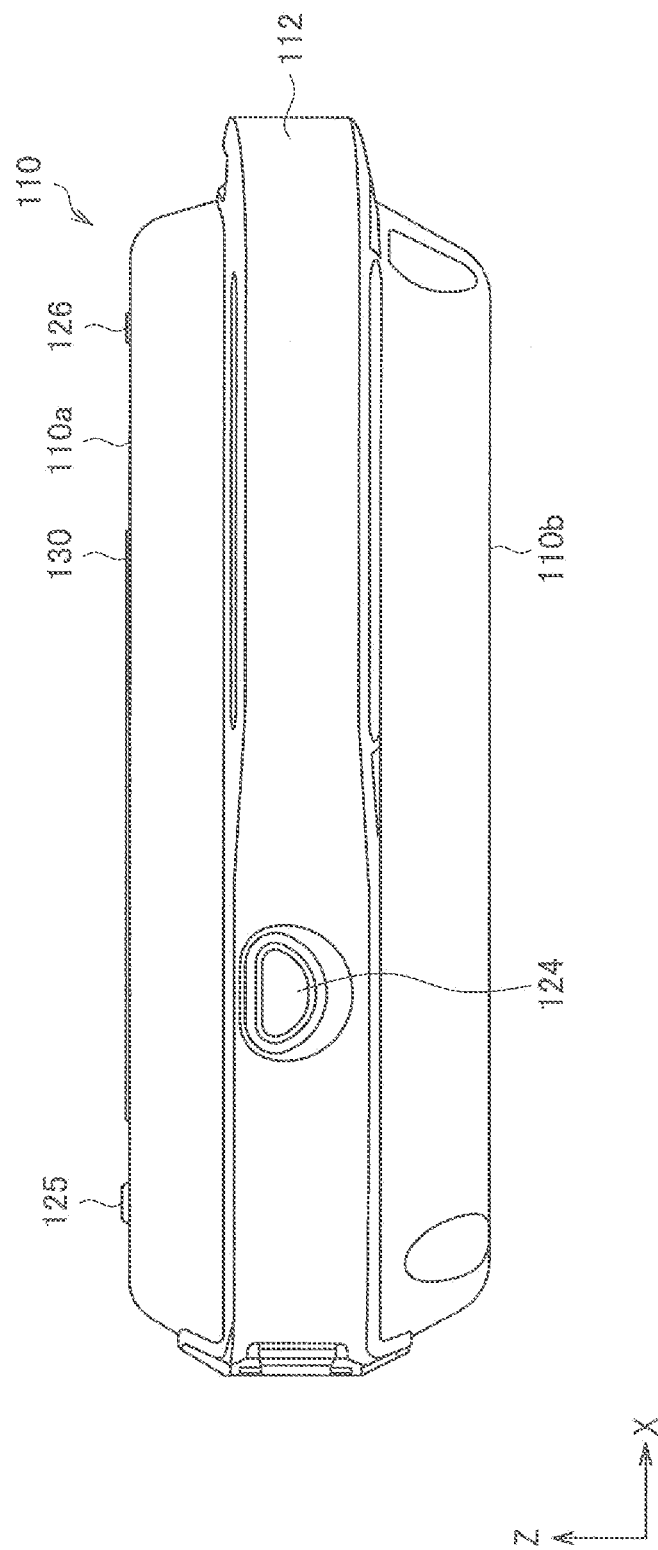
FIG. 6 is a lower side face view of an operation device according to an embodiment.
Figure 7:
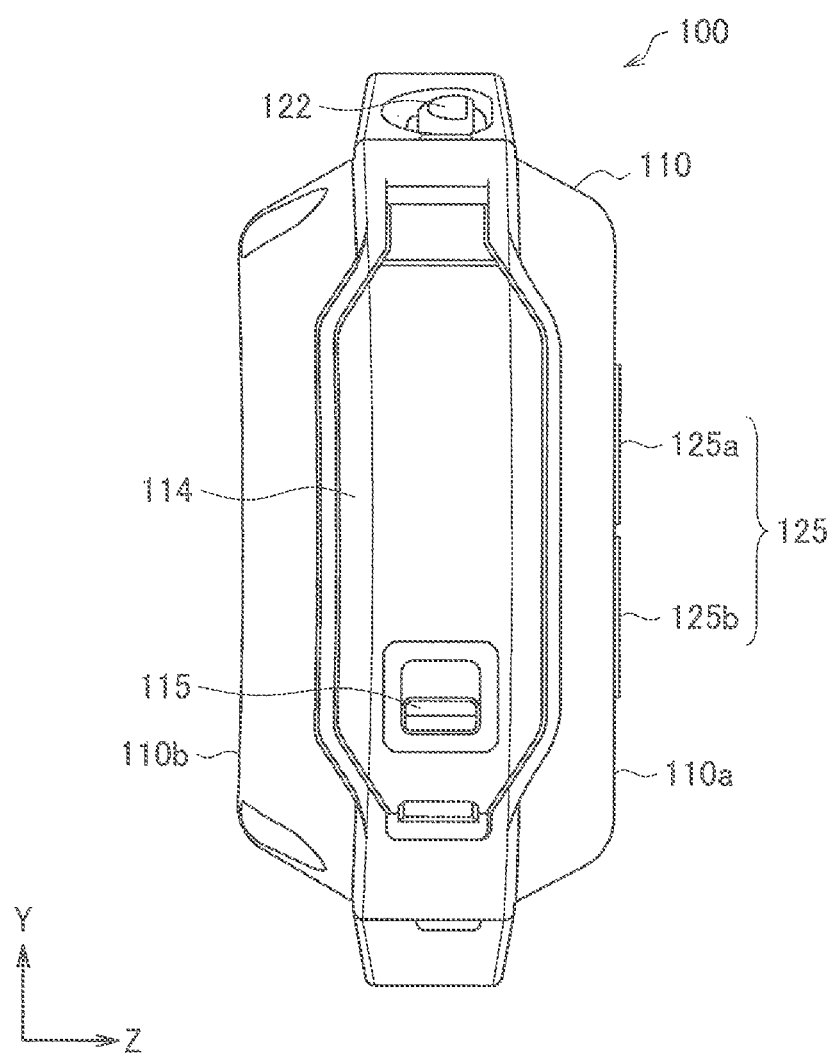
FIG. 7 is a left side face view of an operation device according to an embodiment.
Figure 8:
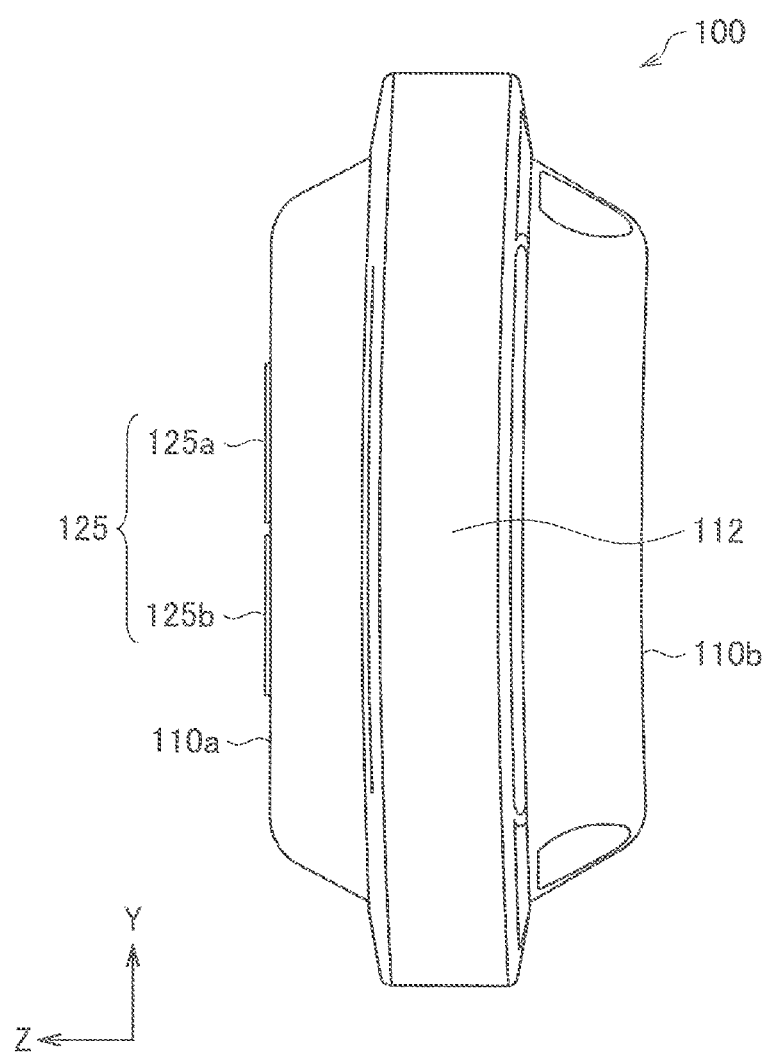
FIG. 8 is a right side face view of an operation device according to an embodiment.
Figure 9:
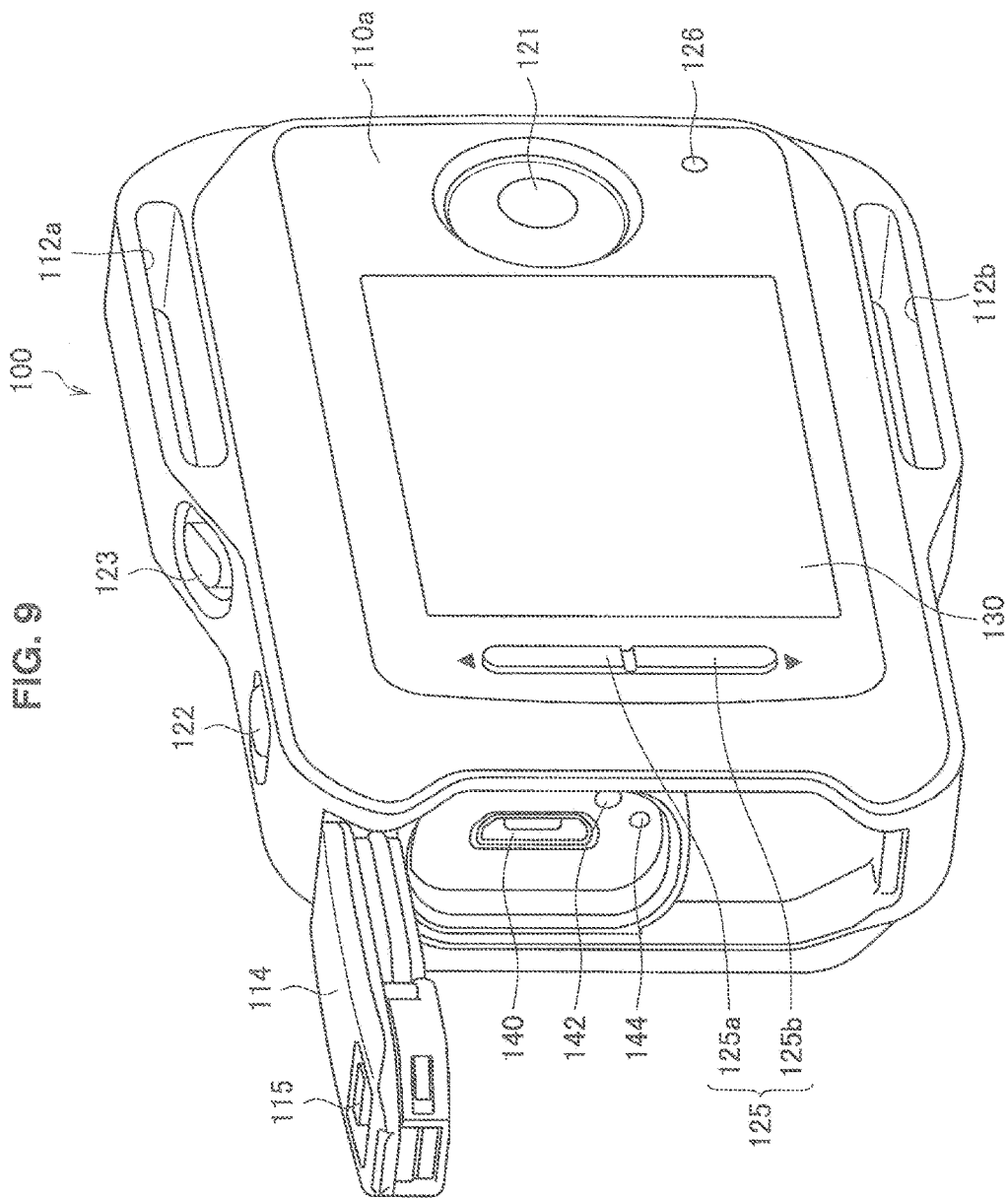
FIG. 9 is a perspective view illustrating an operation device according to an embodiment, with a cover on the left side face of the operation device open.

Description will be made of the structure of the operation device 100 of the operation apparatus 1 according to the present embodiment, on the basis of FIG. 3 to FIG. 9. Note that FIG. 3 is a front face view of the operation device 100 according to the present embodiment. FIG. 4 is a back face view of the operation device 100 according to the present embodiment. FIG. 5 to FIG. 8 are side face views of the operation device 100 according to the present embodiment. FIG. 9 is a perspective view illustrating the operation device 100 according to the present embodiment, with a cover 114 on the left side face 110f of the operation device 100 open. In the present embodiment, four faces at the periphery of the operation device 100 as illustrated in FIG. 3 are referred to as a side face. Particularly, the face viewed from the positive direction of Y axis illustrated in FIG. 5 is referred to as an upper side face 110c, and the face viewed from the negative direction of Y axis illustrated in FIG. 6 is referred to as a lower side face 110d. Also, the face viewed from the negative direction of X axis illustrated in FIG. 7 is referred to as a left side face 110f, and the face viewed from the positive direction of X axis illustrated in FIG. 8 is referred to as a right side face 110e.

[2. 1. Shape and Size]

The operation device 100 is the main body section of the operation apparatus 1, and as illustrated in FIG. 3, contains an operation section for operating the image pickup device, a display section 130, and others, in a housing 110 having a substantially rectangular, planar shape. The shape of the housing 110 is not limited to a substantially rectangular shape, but may be formed in an oval, a circle, a polygon, or the like, for example. Like the operation device 100 according to the present embodiment, the shape having a longer dimension and a shorter dimension enables the operation device 100 to be securely fixed, when the operation device 100 is attached to the attachment object by means of the fixation section 200.

For example, as illustrated in FIG. 1, the operation apparatus 1 is worn on the arm of the user who manipulates the operation device 100, in such a manner that the longitudinal direction (X axis direction in FIG. 3) of the operation device 100 is along the arm of the user, so that more region of the operation device 100 is supported by the arm of the user. In this way, by making the longitudinal direction of the operation device 100 identical with the longitudinal direction of the attachment object such as the arm, the operation device 100 is securely fixed to the attachment object.

Also, for securely fixing the operation device 100 to the attachment object, it is desired that the back face of the operation device 100 do not extend beyond the attachment object. For example, as illustrated in FIG. 1, when the operation apparatus 1 is worn on the arm of the user, if the length of the left and right side faces which are the short sides of the operation device 100 is the length that does not extend beyond the arm, the entire back face 110b substantially opposes the arm. Thereby, the operation device 100 is securely fixed to the arm.

When the length of the left and right side faces, which are the short sides of the operation device 100, is so large as to extend beyond the arm, the shape of the back face 110b of the operation device 100 may be a surface curved along the shape of the arm (the curved surface centered at X axis). By doing so, the proportion of the housing 110 of the operation device 100 that extends beyond the arm is reduced. In that regard, if the shape of the front face 110a is also a curved surface shape along the curved surface shape of the back face 110b, the proportion of the operation device 100 that extends beyond the arm is further reduced.

The shape and the size of the housing 110 of the operation device 100 are decided as appropriate in view of the attachment object for the operation apparatus 1, the situation in which the operation apparatus 1 is used, and others.

[2. 2. Front Face]

As illustrated in FIG. 3, on the front face (the first face) 110a of the operation device 100, a main button 121 which is a first operation section, an up-down operation button 125 which is a second operation section, and a display section 130 are arranged along the longitudinal direction of the housing 110. In other words, the front face 110a is the layout face on which main constituent elements are arranged. The display section 130 is arranged at the center portion of the front face 110a. At the both sides of the display section 130 in the longitudinal direction, the main button 121 and the up-down operation button 125 are arranged so that the display section 130 is interposed therebetween.

(Main Button)

The main button 121 is an operation section to instruct the shooting and the end of shooting of the image pickup device. If the main button 121 is pressed when the image pickup device is not in a recording state in which the image pickup device is shooting the object, an instruction of the start of shooting is transmitted to the image pickup device. Also, if the main button 121 is pressed when the image pickup device is in the recording state, an instruction of the end of shooting is transmitted to the image pickup device. Each time the main button 121 is pressed, the shooting state of the image pickup device is switched.

Also, the main button 121 is used as an operation section to instruct a decision process when setting various settings of the operation device 100. For example, when the main button 121 is pressed in the state where a predetermined item is selected from the menu displayed on the display section 130, the process related to the selected item is carried out.

The process carried out when the main button 121 is pressed is automatically switched by the functional state of the operation device 100. The process operated by the main button 121 is the main process in the operation device 100, and is considered to have a high use frequency. For this reason, as illustrated in FIG. 3, the manipulability of the operation device 100 is enhanced, by making the main button 121 larger than other operation sections.

Also, when the operation apparatus 1 is attached to the left arm of the user as in FIG. 1, the main button 121 is positioned at the right side from the display section 130. In other words, the main button 121 is located closer to the fingertips of the user than the display section 130 is. Accordingly, when the user manipulates the main button 121 with the right hand, the right hand does not hide the display section 130. Also, when the operation apparatus 1 is worn on the right arm of the user, the operation apparatus 1 is turned upside down from the state of FIG. 1 (i.e., with 180° rotation), and worn. By doing so, the main button 121 is positioned at the right side from the display section 130. In other words, the main button 121 is located closer to the fingertips of the user than the display section 130 is. Accordingly, when the user manipulates the main button 121 with the left hand, the left hand does not hide the display section 130. Note that, when the user wears on the right arm the operation apparatus 1 which can be worn on the left arm as in FIG. 1, the information displayed on the display section 130 is in the state turned upside down, without any change. In this case, for example, by performing the operation input for outputting the screen image rotation command for the menu screen image, the information displayed on the display section 130 is rotated 180°.

(Up-Down Operation Button)

The up-down operation button 125 is the operation section used to select an item from the menu displayed on the display section 130. The up-down operation section 125 includes an up button 125a provided at the upper side of the device (the positive direction of Y axis), and a down button 125b provided at the lower side of the device (the negative direction of Y axis). When the up button 125a is pressed, the cursor for selecting an item from the menu in which the items are arranged is moved in one direction. Also, when the down button 125b is pressed, the cursor for selecting an item from the menu in which the items are arranged is moved in the opposite direction relative to when the up button 125a is pressed.

Note that the up-down operation button 125 may be related to, for example, the zoom operation process of the image pickup device, apart from the select operation of the items displayed on the menu. When the up-down operation button 125 is related to a plurality of processes in this way, the process carried out by the manipulation of the up-down operation button 125 is automatically switched by the functional state of the operation device 100.

The up-down operation button 125 according to the present embodiment is provided along the direction (Y axis direction) substantially orthogonal to the longitudinal direction of the housing 110, as illustrated in FIG. 3. The up-down operation button 125 according to the present embodiment is formed as a button of the seesaw type in which the up button 125a and the down button 125b are connected with the pivot point at the center portion, but the present disclosure is not limited to such an example. For example, the up button 125a and the down button 125b may be provided separately. Also, the up-down operation button 125 may be provided not on the front face 110a of the housing 110, but for example on the side face of the housing 110.

(Display Section)

The display section 130 is an output section for displaying the information, and for example, a liquid crystal display, an organic EL display, and the like. The display section 130 occupies a large region in the operation device 100, in the center portion of the front face 110a of the housing 110, for example, a half or more region of the front face 110a. The screen image displayed on the display section 130 includes, for example, a live view screen image and a watch display screen image. The screen image displayed on the display section is selected, for example, by the display button 123 provided on the side face of the housing 110, as described later.

The image of the object shot by the image pickup device that the operation device 100 operates is displayed in the live view screen image. The operation device 100 is equipped with the display section 130 like this, so that the user can operate the image pickup device while confirming the shot content. In the live view screen image, the shot image may be displayed with icons and the information relevant to the remaining battery level of the operation device 100, the remaining battery level of the paired image pickup device, memory card warning display, the operable or non-operable state of the operation section, the zoom state, the video recording state, the shooting mode, and others.

Also, the current time is displayed in the watch display screen image. In the watch display screen image, the current time may be displayed with icons representing the remaining battery level of the operation device 100, airplane mode state, and others.

For example, a notification section 126 for notifying the process carried out by the operation of the main button 121 may be provided on the front face 110a of the operation device 100, in addition to the main button 121, the up-down operation button 125, and the display section 130. For example, a LED lamp or the like may be used as the notification section 126. For example, the notification section 126 lights up when the image pickup device is in the shooting state by pressing of the main button 121, and notifies the user that the recording is proceeding.

Also, the notification section 126 may notify that the operation device 100 and the image pickup device are communicably linked to each other. In this case, the notification section 126 can notify the user of the communicable state, for example, by lighting up with a different color from the light-up color representing the recording in progress. Thereby, the user is notified of the state in which the image pickup device is operable by the operation device 100.

[2. 3. Back Face]

The back face 110b of the operation device 100 is the face opposing the attachment object, and the functional section such as the operation section is not provided as illustrated in FIG. 4. The back face 110b of the operation device 100 is fixed to the housing 110 with screws, and may be detachable from the housing 110 by removing the screws. For example, when the battery provided inside the housing 110 is removed or the like, the screws fixing the back face 110b to the housing 110 are removed, so that the battery become uncovered and detachable.

[2. 4. Side Faces]

The side faces 110c to 110f of the operation device 100 are provided with a connection section to the fixation section 200, side face operation sections for manipulating the operation device 100, a terminal, and others.

(Connection Section)

A part of the side faces of the operation device 100 is connected to the fixation section 200 that holds the operation device 100 and fixes the operation device 100 to the attachment object. In the present embodiment, the belt illustrated in FIG. 1 or FIG. 2 is used as the fixation section 200. For example, as illustrated in FIG. 3, this belt is connected to the operation device 100 through at least any one of the through holes 112a, 112b, 112c that are formed at the extension portions protruding outward from a part of the side faces. In the present embodiment, the through holes 112a, 112b, 112c formed in the side faces are the connection section.

In the operation device 100 according to the present embodiment, the extension portions formed by extending the side faces of the housing outward are formed on the upper side face 110c, the lower side face 110d, and the right side face 110e, and one through hole 112a, 112b, 112c is formed on each extension portion. The extension regions of the upper side face 110c and the lower side face 110d are formed at a part, close to the right side face 110e, of the respective side faces. Also, the extension regions of the operation device 100 of the present embodiment are formed continuously over the upper side face 110c, the right side face 110e, and the lower side face 110d. The through holes 112a, 112b, 112c are holes penetrating through the extension regions in the direction substantially perpendicular to the front face 110a.

In other words, the through holes 112a, 112b, 112c, which are the connection section, illustrated in FIG. 3 correspond to the position at which the main button 121 is formed. As described above, the main button 121 is an operation section of a high use frequency, and is formed so large, relative to other operation sections, as to be pressed unfailingly and easily. In order to press this main button 121 further stably, in the present embodiment the fixation section 200 is located adjacent to the main button 121. Thereby, when the operation apparatus 1 is fixed to the attachment object by the fixation section 200, the main button 121 area is more closely fitted to the attachment object, so that the operation device 100 becomes less likely to tilt when the main button 121 is pressed.

One or more through holes 112a, 112b, 112c are used depending on how to attach the operation apparatus 1 to the attachment object. For example, as illustrated in FIG. 1, when the operation apparatus 1 is worn on the arm of the user, the fixation section 200 is inserted through the through holes 112a, 112b opposite in the direction (in the present embodiment, Y axis direction) across the longitudinal direction of the operation device 100. Also, as illustrated in FIG. 2, when the operation apparatus 1 is hooked on and attached to the attachment object such as a bag, the fixation section 200 is inserted through the through hole 112c, for example.

(Side Face Operation Section)

One or more operation sections for manipulating the operation device 100 may be provided on the side faces of the housing 110. For example, as illustrated in FIG. 3, the operation device 100 according to the present embodiment includes a first side face operation section 122, and a second side face operation section 123 on the upper side face 110c, and includes a third side face operation section 124 on the lower side face 110d.

The first side face operation section 122 is, for example, a menu button. Here, if the first side face operation section 122 is pressed when the operation device 100 is linked to the image pickup device, the setting of the linked image pickup device is conducted. On the other hand, if the first side face operation section 122 is pressed when the operation device 100 is not linked to the image pickup device, the setting of the operation device 100 is conducted.

The second side face operation section 123 is, for example, a display button. Here, each time the second side face operation section 123 is pressed, the live view screen image and the watch display screen image are switched.

The third side face operation section 124 is, for example, a power source button. Here, each time the third side face operation section 124 is pressed, on and off of the power source of the operation device 100 are switched.

As illustrated in FIG. 3, these side face operation section 122, 123, 124 are provided in such a manner to circumvent the extension portions in which the through holes 112a, 112b, 112c are formed. Thereby, when the fixation section 200 is connected to the through holes 112a, 112b, 112c, the side face operation sections 122, 123, 124 are prevented from being hidden by the fixation section 200 and becoming not manipulable.

Also, by providing the side face operation sections 122, 123, 124 on the side faces (the upper side face 110c, the lower side face 110d) of the long side along the longitudinal direction of the operation device 100, the user can pinch the upper side face 110c and the lower side face 110d and manipulate the side face operation sections 122, 123, 124. At this time, since the distance between the upper side face 110c and the lower side face 110d is shorter than the distance between the right side face 110e and the left side face 110f, the user can hold the housing 110 without effort. Further, by providing the side face operation sections 122, 123, 124 in a staggered manner so as not to overlap the positions in the longitudinal direction of the housing 110, the user is prevented from pressing the side face operation section, which is not to be pressed, by mistake when holding the housing 110.

Here, description will be made of a case in which the first side face operation section 122 provided on the upper side face 110c is manipulated, as an example of manipulation of the side face operation section 122 by the user. The user manipulates the first side face operation section 122 with the right hand, in the state in which the operation apparatus 1 is attached to the left arm as in FIG. 1. In that case, in order to prevent the operation apparatus 1 from moving on the left arm when the first side face operation section 122 is pressed with the index finger of the right hand, the thumb of the right hand is put at the position opposite to the first side face operation section 122 on the lower side face 110d of the operation apparatus 1. At this time, the third side face operation section 124 located on the lower side face 110d is located in a staggered manner at a position shifted to the right side from the position opposite to the first side face operation section 122 of the lower side face 110d. By this layout and arrangement of the side face operation sections 122, 124, the possibility that the user presses the third side face operation section 124 by mistake when manipulating the first side face operation section 122 is reduced.

As illustrated in FIG. 3, the side face operation sections 122, 123, 124 may be provided in such a manner to protrude from the side faces. Thereby, the side face operation sections 122, 123, 124 are pressed easily. Also, as illustrated in FIG. 5 and FIG. 6, the side face operation sections 122, 123, 124 may be formed in a shape easily manipulated. For example, the side face operation sections 122, 123, 124 are formed in a rounded shape toward the front face 110a.

(Cover)

As illustrated in FIG. 7 and FIG. 9, an openable and closable cover 114 is provided in the left side face 110f of the operation device 100 according to the present embodiment.

FIG. 7 illustrates the state in which the cover 114 is closed. The cover 114 swivels around the open-close axis to be opened and closed, for example with the end portion of the upper side as the open-close axis. As illustrated in FIG. 7, the open-close switch 115 is provided on the surface of the cover 114, at the end portion opposite to the open-close axis (i.e., the end portion of the lower side). The open-close switch 115 is a member to manipulate the latch state between the housing 110 and the cover 114. In the state in which the cover 114 is closed, the hook of the open-close switch 115 is latched on the housing 110. When the open-close switch 115 is moved to a predetermined direction in the state in which the cover 114 is closed, the hook latched on the housing 110 moves to depart from the housing 110, in order to make the cover 114 rotatable.

As illustrated in FIG. 9, the cover 114 covers a terminal 140, a reset button 142, a charge lamp 144, and others. The terminal 140 is, for example, a USB terminal or the like. By linking the external device and the operation device 100 via the terminal 140, the battery of the operation device 100 is charged. Also, by lighting up the charge lamp 144 during charging of the operation device 100, the user is notified of the charge state. Also, by linking the external device such as a personal computer and the operation device 100 via the terminal 140, the application and the like recorded in the operation device 100 is updated. The reset button 142 is a button for resetting the setting of the operation device 100 to the initial state.

In the above, the structure of the operation device 100 according to the present embodiment has been described. Note that the operation device 100 may have waterproof property. By having the waterproof property, the operation apparatus 1 can be used, for example, around water and in water as well.

<3. Fixation Section>

Figure 10:
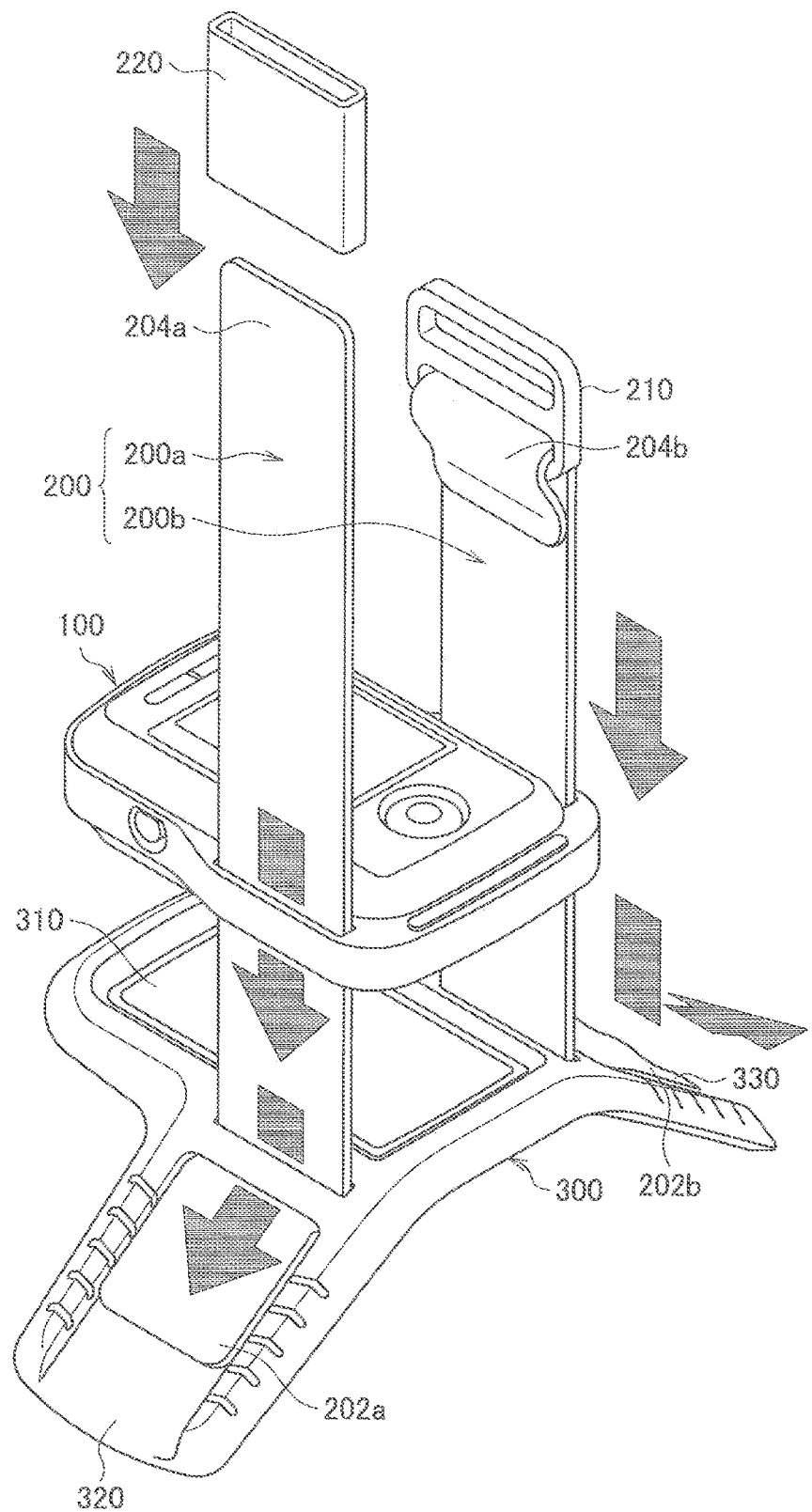
FIG. 10 is an exploded perspective view illustrating a state in which a fixation section is connected to an operation device according to an embodiment.

Next, on the basis of FIG. 10, description will be made of the fixation section 200 for holding the operation device 100 and fixing the operation device 100 to the attachment object. FIG. 10 is an exploded perspective view illustrating a state in which the fixation section 200 is connected to the operation device 100 according to the present embodiment.

In the present embodiment, the belt is used as the fixation section 200 as described above. For example, when the operation apparatus 1 of the watch type is fixed to the arm of the user as illustrated in FIG. 1, the fixation section 200 is connected to the through hole 112a of the upper side face 110c and the through hole 112b of the lower side face 110d. Also, in the operation apparatus 1 according to the present embodiment, a base plate 300 made of rubber illustrated in FIG. 10 may be interposed when connecting the operation device 100 and the fixation section 200.

The base plate 300 includes a first plate 310 that corresponds to the back face 110b of the operation device 100. Also, with the first plate 310, the second plate 320 is extended from the position that corresponds to the through hole 112b of the lower side face 110d of the operation device 100, and the third plate 330 is extended from the position that corresponds to the through hole 112a of the upper side face 110c of the operation device 100.

In more detail, in the present embodiment, the first belt 200a and the second belt 200b are used as the fixation section 200. After one end 202a of the first belt 200a is inserted through the through hole 112b of the operation device 100, the first belt 200a is inserted through the opening of the second plate 320 of the base plate 300, and fixed to the end portion of the second plate 320. After one end 202b of the second belt 200b is inserted through the through hole 112a of the operation device 100, the second belt 200b is inserted through the opening of the third plate 330 of the base plate 300, and fixed to the end portion of the third plate 330. Then, the back face 110b of the operation device 100 is mounted on the first plate 310.

On the other hand, the other end 204a of the first belt 200a is positioned at the front face 110a side from the through hole 112b. The other end 204a is inserted through the end portion holding member 220 for holding the unused portion of the other end 204b of the second belt 200b. Also, a buckle 210 is fixed to the other end 204b of the second belt 200b.

The user puts the first plate 310 of the base plate 300 of the operation apparatus 1 on the arm, and winds the first belt 200a and the second belt 200b around the arm. Then, by fixing the end portion 204a of the first belt 200a with the buckle 210 of the second belt 200b, the user can wear the operation apparatus 100.

In the above, description has been made of the structure of the fixation section 200 according to the present embodiment. Note that the fixation section 200 according to an embodiment of the present technology is not limited to such an example. For example, the connection method between the fixation section 200 and the operation device 100 is not limited to such an example, but the fixation section 200 may be directly fixed to the operation device 100.

<4. Functional Configuration>

Figure 11:
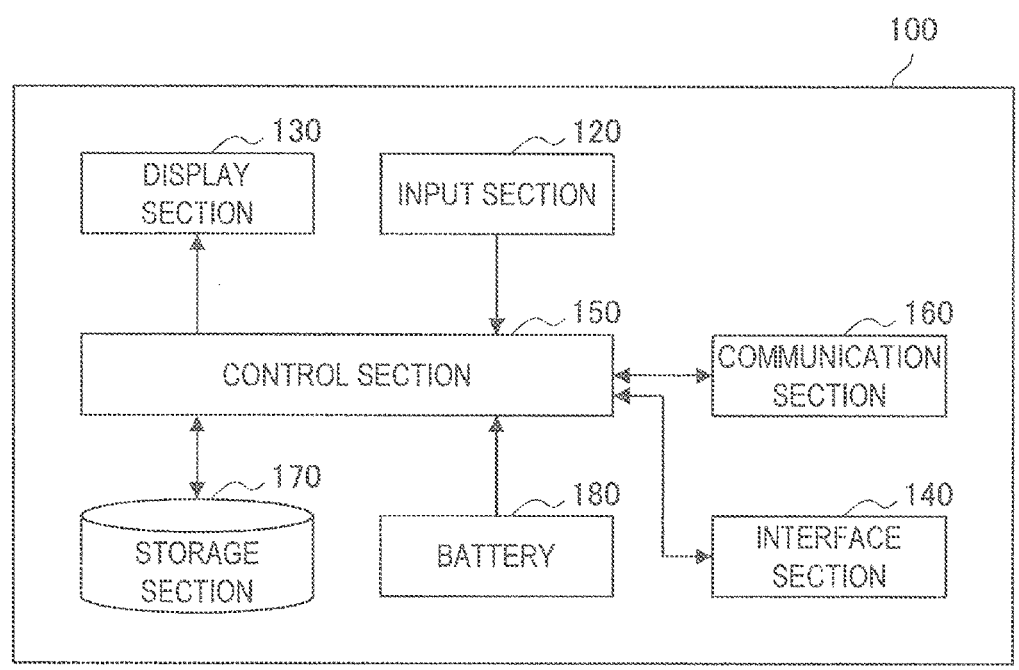
FIG. 11 is a hardware configuration diagram illustrating an example of a hardware configuration of a functional configuration of an operation apparatus according to an embodiment.

FIG. 11 illustrates one example of the hardware configuration of a functional configuration of the operation apparatus 100 according to the present embodiment. As illustrated in FIG. 11, the operation device 100 includes an input section 120, a display section 130, an interface section 140, a control section 150, a communication section 160, a storage section 170, and a battery 180.

The input section 120 accepts the operation input from the user. The input section 120 is, for example, the main button 121, the up-down operation button 125, the side face operation sections 122, 123, 124, and others, which are illustrated in FIG. 1.

The display section 130 displays and outputs the information. The display section 130 corresponds to the display section 130 illustrated in FIG. 1, and for example, a liquid crystal display and an organic EL display are used.

The interface section 140 is a linkage section for linking the operation device 100 to the external device with a wire. The interface section 140 corresponds to the terminal 140 illustrated in FIG. 9.

The control section 150 controls the general function of the operation device 100. The control section 150 is configured, for example, by means of a CPU or the like. For example, the control section 150 carries out a predetermined process on the basis of the operation input from the input section 120, and controls transmission and reception of the information with the image pickup device via the communication section 160. Also, the control section 150 causes the display section 130 to display a predetermined information, and controls the charging of the battery 180. Further, the control section 150 also conducts the update of the applications used in the operation device 100, and others.

The communication section 160 is a linkage section for wirelessly communicating with the external device such as the image pickup device. For the communication section 160, a wireless local area network (LAN) compatible communication device, such as for example Wi-Fi, can be used. For example, the communication section 160 receives the image shot by the image pickup device via the communication section 160, and transmits the control information for operating the image pickup device.

The storage section 170 stores various setting information used in the operation device 100 and the application. The storage section 170 is configured, for example, by means of a random access memory (RAM), a flash memory, and the like.

The battery 180 is a power source of the operation device 100. The battery 180 may be configured to be chargeable, for example via the interface section 140.

<5. Use of Operation Apparatus>

Figure 12:
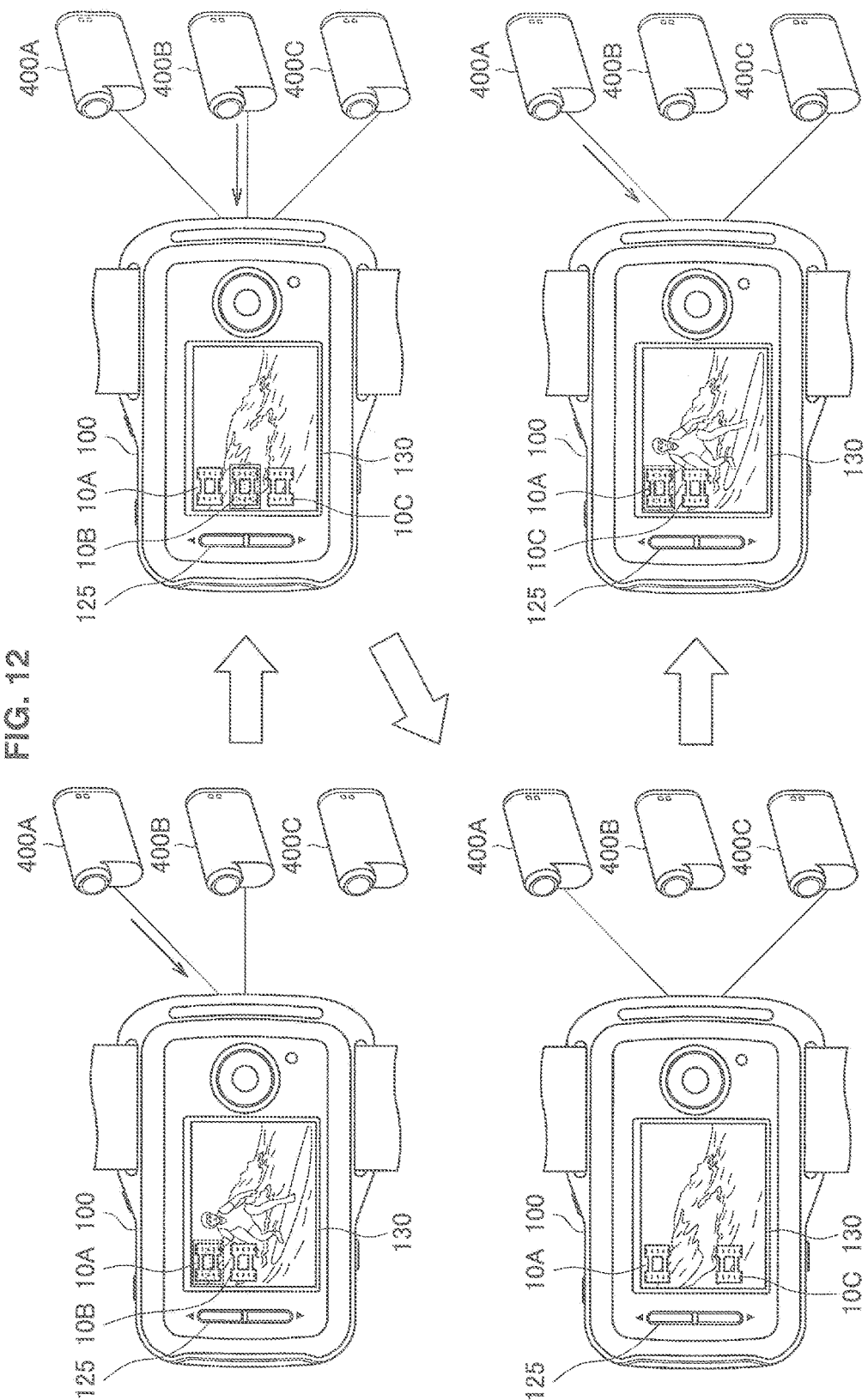
FIG. 12 is an explanatory diagram illustrating an example of change of an image and a GUI displayed on a display section of an operation device according to an embodiment.

Description will be made of the state of the operation apparatus 1 according to the present embodiment at the time of use, on the basis of FIG. 12 and FIG. 13. The operation apparatus 1 according to the present embodiment can operate one image pickup device, and can operate a plurality of image pickup devices. For example, as illustrated in FIG. 12, the operation apparatus 1 can conduct the operation of a plurality of image pickup devices 400A, 400B, 400C. At this, the control section 150 of the operation device 100 may cause the image transmitted from one image pickup device selected from the image pickup devices 400A, 400B, 400C, to be displayed on the entire display region of the display section 130. The image to be displayed on the display section 130 is switched, for example, by displaying graphical user interfaces (GUI) associated with the image pickup devices 400 on the display section 130, and selecting the displayed GUI via the input section 120. Note that the GUI is also referred to as "icon", "image", "object", "display representing the image pickup device 400", "display representing the state of the image pickup device 400" or the like.

First, the control section 150 causes the display section 130 to display the received image and the GUIs corresponding to the linked image pickup devices 400, respectively. For example, as illustrated at the left of the upper side of FIG. 12, the control section 150 can display a vertical row of the aligned GUIs 10A and 10B corresponding to the respective linked image pickup devices 400A and 400B, in a superimposed manner on the image received from the image pickup device 400A. Also, the GUIs corresponding to the image pickup devices 400 are displayed at the position proximal to the up-down operation button 125 in the displayed screen image of the display section 130. For this reason, the user can intuitively understand that the screen image display is changed by the user's own operation. Note that, in the above the description has been made of an example in which the GUIs are displayed in a row but the GUIs may be displayed in a plurality of rows.

Also, when the operation device 100 is, in use, rotated from the orientation illustrated in FIG. 12, the control section 150 may rotates the screen image displayed on the display section 130. Specifically, when the rotation of the operation device 100 is detected by a sensor that the operation device 100 is additionally equipped with, the control section 150 rotates the displayed screen image by the detected rotation angle. For example, when an angular velocity sensor or the like detects that the operation device 100 has rotated 180°, the control section 150 can rotate the displayed screen image by 180° toward the direction opposite to the detected rotation direction. For this reason, the screen image is displayed in response to the state in which the user uses the operation device 100, and thereby the convenience for the user is improved. Note that, when rotating the displayed screen image, the control section 150 can renew the display in such a manner that the GUIs are displayed at the positions proximal to the up-down operation button 125.

Also, the control section 150 displays the GUIs in such a manner to show the image pickup device 400 transmitting the displayed image. For example, as illustrated at the left of the upper side of FIG. 12, the control section 150 may cause the image received from the image pickup device 400A to be displayed, and cause the background of the display region of the GUI corresponding to the image pickup device 400A to be displayed in an opaque manner. For this reason, the user can know the image pickup device 400 transmitting the displayed image. Further, by displaying the background of the display region of the GUI in an opaque manner, the user can visually know the image pickup device 400 transmitting the displayed image.

Note that, in the above, description has been made of an example in which the control section 150 causes the background of the GUI corresponding to the image pickup device 400 transmitting the displayed image to be displayed in an opaque manner, but the control section 150 may cause the background of the display region of the GUI corresponding to the image pickup device 400 transmitting the displayed image to be displayed in a different manner from the background of the display region of other GUI. For example, the control section 150 may display the color or the pattern of the background of the display region of the GUI corresponding to the image pickup device 400 transmitting the displayed image, in a different manner from the color or the pattern of the background of the display region of other GUI. For this reason, the visual difference between the GUI corresponding to the image pickup device 400 transmitting the displayed image and other GUI is emphasized, so that the user can know the image pickup device 400 transmitting the displayed image more easily.

Also, the control section 150 may display the object representing the image pickup device 400 transmitting the displayed image, around the GUI corresponding to the image pickup device 400. For example, the control section 150 may display the object, such as an arrow and a triangle, pointing at the GUI, at a position proximal to the GUI corresponding to the image pickup device 400 transmitting the displayed image. In this case, the object is additionally displayed in addition to the GUI, so that the user can know the GUI of the selection state better.

Thereafter, when the image pickup device 400 is additionally linked, the control section 150 displays the GUI corresponding to the additionally linked image pickup device 400, in such a manner to add the GUI in the line of the currently displayed GUIs. For example, as illustrated at the right of the upper side of FIG. 12, when the image pickup device 400C is additionally linked, the control section 150 displays the GUI 10C corresponding to the image pickup device 400C below the GUI 10B. In this way, the control section 150 displays the GUIs in such a manner to align the GUIs in the order that the image pickup devices 400 are linked. For this reason, the user can know which image pickup device 400 the GUI corresponds to.

Thereafter, when the user conducts the operation for changing the selected GUI (hereinafter, also referred to as GUI of the selection state) by means of the up-down operation button 125, the control section 150 causes the display section 130 to display the image received from the image pickup device 400 corresponding to the GUI of the selection state after the change. For example, when the user conducts the operation for changing the GUIs of the selection state from the GUI 10A to the GUI 10B by means of the up-down operation button 125, the control section 150 causes the communication section 160 to transmit the image transmission stop request to the image pickup device 400A, and to transmit the image transmission request to the image pickup device 400B. Then, as illustrated at the right of the upper side of FIG. 12, the control section 150 switches the displayed image to the image received from the image pickup device 400B. Also, the control section 150 renders the background of the display region of the GUI 10B of the selection state opaque.

Thereafter, when the receipt of the displayed image from the image pickup device 400 stops, the control section 150 deletes the GUI corresponding to the image pickup device 400. For example, as illustrated at the left of the lower side of FIG. 12, when the communication linkage with the image pickup device 400B is cut off and the display image stops being received by the communication section 160, the control section 150 deletes the GUI corresponding to the image pickup device 400B from the displayed screen image. Note that, the left of the lower side of FIG. 12 illustrates an example in which the control section 150 continues displaying the image received from the image pickup device 400B for the last time, but the control section 150 may stop displaying the image when the image from the image pickup device 400B stops being received. For example, when the displayed image stops being received, the control section 150 can stop displaying the image and darkens the screen image, until the image to be displayed next is received. Thereby, the user can easily notice that the displayed image has stopped being received.

Thereafter, the control section 150 identifies the image pickup device 400 transmitting the displayed image, with reference to the display history and others, and causes the display section 130 to display the image received from the identified image pickup device 400. Also, the control section 150 causes the background of the display region of the GUI corresponding to the identified image pickup device 400 to be displayed in an opaque manner. Further, when the deletion of the GUI creates a vacancy in the line of the GUI, the control section 150 causes the GUI displayed next to the deleted GUI to be displayed at the region corresponding to the display position of the deleted GUI before the deletion. For example, the control section 150 can identify the image pickup device 400A that has transmitted the image displayed right before the image received from the image pickup device 400B with reference to the display history, and cause the communication section 160 to transmit the image transmission request to the image pickup device 400A. Then, as illustrated at the right of the lower side of FIG. 12, the control section 150 can cause the image received from the image pickup device 400A to be displayed on the display section 130. Also, as illustrated at the right of the lower side of FIG. 12, the control section 150 can cause the background of the display region of the GUI corresponding to the image pickup device 400A to be displayed in an opaque manner. Further, as illustrated at the right of the lower side of FIG. 12, the control section 150 can cause the GUI 10C corresponding to the image pickup device 400 to be moved to the region where the GUI 10B corresponding to the image pickup device 400B has been displayed. Note that, when the GUI is deleted, the control section 150 may cause the GUI 10C to be moved to the region where the GUI 10B has been displayed.

In this way, the operation apparatus 1 according to the present embodiment, the control section 150 causes the GUI corresponding to the image pickup device 400 selected via the up-down operation button 125 to be displayed, and switches the displayed image to the image transmitted by the image pickup device 400 corresponding to the GUI of the selection state. For this reason, the user can visually confirm and conduct the select operation of the image pickup device 400 according to the displayed image.

Also, the GUIs displayed on the display section 130 do not only represent the presence of the image pickup devices 400 having communication linkage to the operation device 100, but also may change the GUIs in response to image pickup mode of each image pickup device 400. For example, if the shooting mode of each image pickup device 400A, 400B, 400C are different from each other when three image pickup devices 400A, 400B, 400C have communication linkage to the operation device 100 as illustrated at the right of the upper side of FIG. 12, different GUIs are displayed as illustrated in FIG. 13. Here, the GUI 10 corresponds to the image pickup device 400A, and the GUI 12 corresponds to the image pickup device 400B, and the GUI 14 corresponds to the image pickup device 400C.

Figure 13:
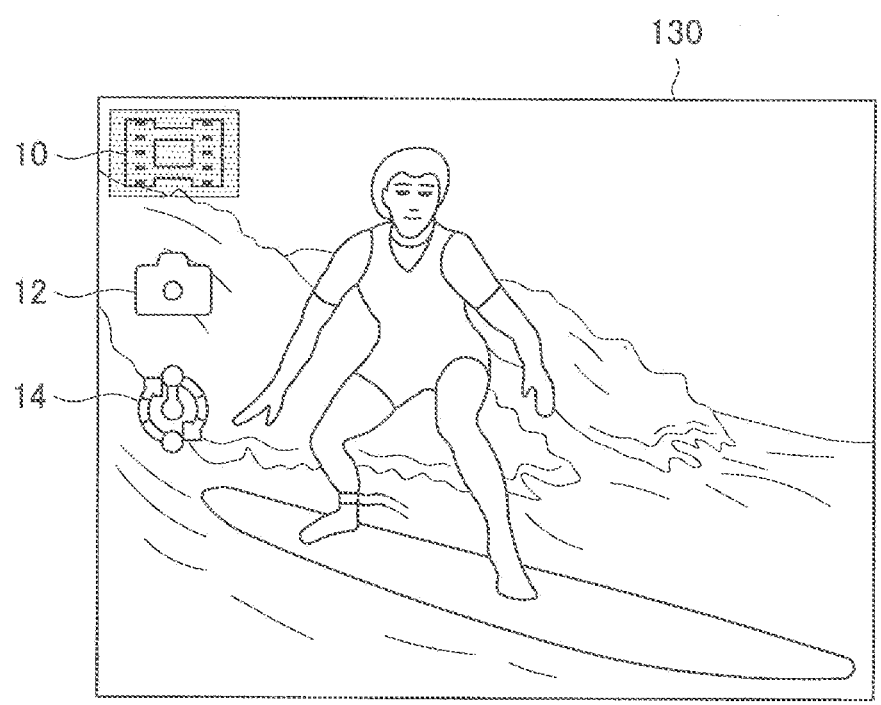
FIG. 13 is an explanatory diagram illustrating an example of a shooting mode, presented by a GUI, of an image pickup device linked to an operation device.

For example, the GUI 10 illustrated in FIG. 13 represents the moving image shooting mode, and indicates that the image pickup device 400A is set in the mode for acquiring the moving image. Also, the GUI 12 represents the still image shooting mode, and indicates that the image pickup device 400B is set in the mode for acquiring the still image. Further, the GUI 14 represents the interval still image mode, and indicates that the image pickup device 400C is set in the mode for shooting the still image at a predetermined time interval. The control section 150 shows the shooting modes of the image pickup devices 400 having communication linkage to the operation device 100 with the GUIs in this way, so that the user can visually know the shooting modes of the linked image pickup devices 400, and the convenience for the user is improved.

<6. Conclusion>

In the above, description has been made of the configuration of the operation apparatus 1 according to the present embodiment. The operation apparatus 1 according to the present embodiment includes the main button 121 and the display section 130 on the front face 110a of the operation device 100, so that the user can conduct the operation while viewing the image shot by the image pickup device. Also, the operation apparatus 1 is capable of holding the operation device 100 with the fixation section 200, and attaching the operation device 100 to the attachment object. Thereby, the portability of the operation apparatus 1 is enhanced.

The preferred embodiment of the present disclosure has been described above in detail with reference to the accompanying drawings, whilst the technical scope of the present disclosure is not limited to such an example. A person having ordinary knowledge in the technical field of the present disclosure obviously can conceive of various alterations and modifications within the scope of the technical concept recited in the appended claims, and it should be understood that they will naturally come under the technical scope of the present disclosure.

For example, in the above embodiment, FIG. 1 illustrates an example in which the operation apparatus 1 is worn on the left arm of the user, but the operation apparatus 1 can be worn on the right arm as well. At this time, the operation apparatus 1 is worn in such a manner that the main button 121 is positioned closer to the user's wrist, so that the main button 121 area is securely fixed to the arm, and the operation device 100 becomes less likely to tilt at the time of manipulation of the main button 121. Note that, comparing the operation apparatus 1 worn on the left arm and the operation apparatus 1 worn on the right arm, the operation device 100 is worn upside down. At this time, the direction detection sensor, such as for example, a gyroscopic sensor, may be provided in the operation device 100 to detect the direction of the operation device 100, so that the direction of the display of the display section 130 is automatically rotated in response to the wearing state of the user.

Also, the operation apparatus 1 according to the present embodiment may be equipped with a global positioning system (GPS), and various sensors such as an altimeter, a barometer, a sphygmomanometer, a pulsometer, an acceleration sensor, and an angular velocity sensor, and may be configured to transmit the acquired various information to the image pickup device.

Also, a touch panel may be provided in the display section 130, so that the user can manipulate the operation apparatus 1 by the touch panel.

Also, the effects described in the present specification are only explanatory and exemplary, and are not restrictive. That is, the technology according to the present disclosure can achieve other effects which are obvious for a person skilled in the art from the description of the present specification, along with the above effects or instead of the above effects.

Additionally, the present technology may also be configured as below.

(1)
An operation apparatus including:
  a main body section including
    an operation section including a first operation section for performing a record operation of an image pickup device, and
    a display section that displays an image transmitted from the image pickup device; and
  a fixation section that fixes the main body section to an attachment object,
  wherein the first operation section and the display section are both located on a first face of the main body section.

(2)
The operation apparatus according to (1), wherein
  the display section is provided at a center portion of the first face, and
  the first operation section is provided at a side portion of the first face.

(3)
The operation apparatus according to (1) or (2), wherein
  the operation section includes a second operation section on the first face of the main body section, and
  the second operation section is arranged in such a manner that the display section is interposed between the first operation section and the second operation section.

(4)
The operation apparatus according to any one of (1) to (3), wherein
  the fixation section is a belt that fixes the main body section to an arm of a user who manipulates the operation apparatus, and
  when the user wears the operation apparatus on one arm, the first operation section is located closer to fingers of the one arm of the user than the display section is.

(5)
The operation apparatus according to (4), wherein
  the fixation section is a belt that fixes the main body section to an arm of a user who manipulates the operation apparatus, and
  when the user wears the operation apparatus on the other arm, the first operation section is located closer to fingers of the other arm of the user than the display section is, and the display section displays information with approximately 180° rotation relative to when the user wears the operation apparatus on the one arm.

(6)
The operation apparatus according to any one of (1) to (5), wherein
  the main body section includes a notification section that notifies a state of the image pickup device, on the first face of the main body section, and
  the notification section is provided adjacent to the first operation section.

(7)
The operation apparatus according to any one of (1) to (6), wherein
  the first operation section and the display section are located side by side in a longitudinal direction of the main body section, and
  the display section includes a region having a vertical direction and a lateral direction that is longer than the vertical direction, and the display section is arranged in such a manner that the longitudinal direction of the main body section is substantially identical with the lateral direction of the display section.

(8)
The operation apparatus according to any one of (1) to (7), wherein
  the main body section includes a connection section to which the fixation section is connected.

(9)
The operation apparatus according to (8), wherein
  the first operation section and the display section are located side by side in a longitudinal direction of the main body section, and
  the connection section is provided at a position shifted in the longitudinal direction from a center of the main body section to a side where the first operation section is located.

(10)
The operation apparatus according to any one of (1) to (9), wherein
  the main body section includes one or more side face operation sections.

(11)
The operation apparatus according to (10), wherein
  when the main body section includes a connection section to which the fixation section is connected, at a side face of the main body section, the one or more side face operation sections are provided in such a manner to circumvent a position at which the connection section is formed.

(12)
The operation apparatus according to (10) or (11), wherein
  the one or more side face operation sections protrude from one or more side faces of the main body section.

(13)
The operation apparatus according to any one of (10) to (12), wherein
  the one or more side face operation sections are provided on one or more side faces along a longitudinal direction of the main body section.

(14)
The operation apparatus according to (13), wherein
  the side face operation sections are provided at positions not overlapping with each other along the longitudinal direction, when provided on the opposite side faces respectively.

What is claimed is:
1. A remote displaying apparatus comprising:
  a display configured to display information of the remote displaying apparatus and information transmitted from an image pickup apparatus;
  a belt configured to fix the display to a user arm;

a rechargeable battery configured to be housed in a housing of the remote displaying apparatus;
a communication section configured to wirelessly communicate with the image pickup apparatus; and
circuitry configured to
    receive power from the rechargeable battery,
    generate a first battery information indicating a remaining battery level of the rechargeable battery, and
    control the display to display a first icon representing the first battery information and a second icon representing a second battery information indicating a remaining battery level of the image pickup apparatus.

2. The remote displaying apparatus according to claim 1, wherein the housing further includes a first operation button to transmit an instruction of a start or an end of recording to the image pickup apparatus.

3. The remote displaying apparatus according to claim 2, further comprising a connection section for attaching the housing to the belt,
    wherein the housing includes a first face, the display and the first operation button are on the first face, and the connection section is at a second face of the housing other than the first face.

4. The remote displaying apparatus according to claim 2, further comprising one or more second operation buttons.

5. The remote displaying apparatus according to claim 4, wherein the housing includes a first face and one or more side faces, the display and the first operation button are on the first face, and the one or more second operation buttons are on the one or more side faces.

6. The remote displaying apparatus according to claim 5, wherein the one or more second operation buttons protrude from the one or more side faces.

7. The remote displaying apparatus according to claim 1, wherein the housing includes a selection button used to select an item from a menu displayed on the display.

8. The remote displaying apparatus according to claim 1, wherein the housing includes a notification section configured to provide a notification when the image pickup apparatus in a recording state.

9. The remote displaying apparatus according to claim 1, wherein the housing includes a sensor configured to sense an attitude of the remote displaying apparatus.

10. The remote displaying apparatus according to claim 9, wherein the sensor is further configured to sense a direction in which the display is rotated based on a result of the sensing of the attitude.

11. The remote displaying apparatus according to claim 9, wherein the circuitry is configured to control the display to display with a rotation based on a result of the sensing of the attitude.

12. The remote displaying apparatus according to claim 1, further comprising a base plate configured to be interposed between the housing and the user arm when the remote displaying apparatus is fixed to the user arm.

13. The remote displaying apparatus according to claim 1, wherein the communication section configured to wirelessly communicate with a plurality of image pickup apparatuses simultaneously.

14. A non-transitory computer-readable medium storing instructions that, when executed by a processor of a remote display apparatus having a display configured to display information of the remote displaying apparatus and information transmitted from an image pickup apparatus, a belt configured to fix the display to a user arm, a rechargeable battery configured to be housed in a housing of the remote displaying apparatus, and a communication section configured to wirelessly communicate with the image pickup apparatus, cause the remote displaying apparatus to execute operations comprising:
    receiving power from the rechargeable battery,
    generating a first battery information indicating a remaining battery level of the rechargeable battery, and
    controlling the display to display a first icon representing the first battery information and a second icon representing a second battery information indicating a remaining battery level of the image pickup apparatus.

15. The non-transitory computer-readable medium according to claim 14, the operations further comprising transmitting an instruction of a start or an end of recording to the image pickup apparatus.

16. The non-transitory computer-readable medium according to claim 14, the operations further comprising providing a notification when the image pickup apparatus is in a recording state.

17. The non-transitory computer-readable medium according to claim 14, the operations further comprising sensing an attitude of the remote displaying apparatus.

18. The non-transitory computer-readable medium according to claim 17, the operations further comprising sensing a direction in which the display is rotated based on a result of the sensing.

19. The non-transitory computer-readable medium according to claim 17, the operations further comprising controlling the display to display with a rotation based on a result of the sensing.

20. The non-transitory computer-readable medium according to claim 14, the operations further comprising wirelessly communicating with a plurality of image pickup apparatuses simultaneously.

* * * * *